United States Patent [19]

Deck

[11] 3,734,602

[45] May 22, 1973

[54] SLOT LOAD PROJECTOR

[75] Inventor: Howard C. Deck, Rush, N.Y.

[73] Assignee: Grafler Inc., Pittsford, N.Y.

[22] Filed: Apr. 17, 1972

[21] Appl. No.: 244,579

[52] U.S. Cl. ..................352/157, 352/124, 352/166, 352/173, 352/191

[51] Int. Cl. ............................................G03b 1/56

[58] Field of Search.......................352/157, 158, 159, 352/166, 191, 124, 173

[56] References Cited

UNITED STATES PATENTS 3,119,300 1/1964 Barocela..........................352/157 X

*Primary Examiner*—Samuel S. Matthews
*Assistant Examiner*—Monroe H. Hayes
*Attorney*—George W. Shaw et al.

[57] ABSTRACT

A slot load projector uses a slot for edgewise loading of a filmstrip, and simplifies the controls for forward, reverse, rewind, and fast forward. A single control lever moves between two positions for forward and reverse projection in one position, and load, rewind, and fast forward run in another position. Push buttons for forward run, reverse run, off, and still, complete the operator controls, for simpler and easier operation. Along with increased operational functions with fewer controls, the projector is simplified in structure for economy of manufacture.

58 Claims, 21 Drawing Figures

| COMPONENT | FORWARD | REVERSE | FAST FORWARD | REWIND | BRAKE FAST FORWARD | BRAKE REWIND |
|---|---|---|---|---|---|---|
| UP CONTROL LEVER | X | X | O | O | O | O |
| DOWN CONTROL LEVER | O | O | X | X | X | X |
| FORWARD BUTTON | X | O | X | O | O | O |
| REVERSE BUTTON | O | X | O | X | O | O |
| STILL BUTTON | O | O | O | O | X | X |
| OFF BUTTON | O | O | O | O | X | X |
| SOLENOID FOR SUPPLY REEL | O | X | O | X | X | O |
| SOLENOID FOR FAST RUN | O | O | X | X | X | X |
| SOLENOID FOR TAKE-UP REEL | O | O | X | O | O | X |
ON OR ENGAGED = X
OFF OR DISENGAGED = O
FIG. 3.
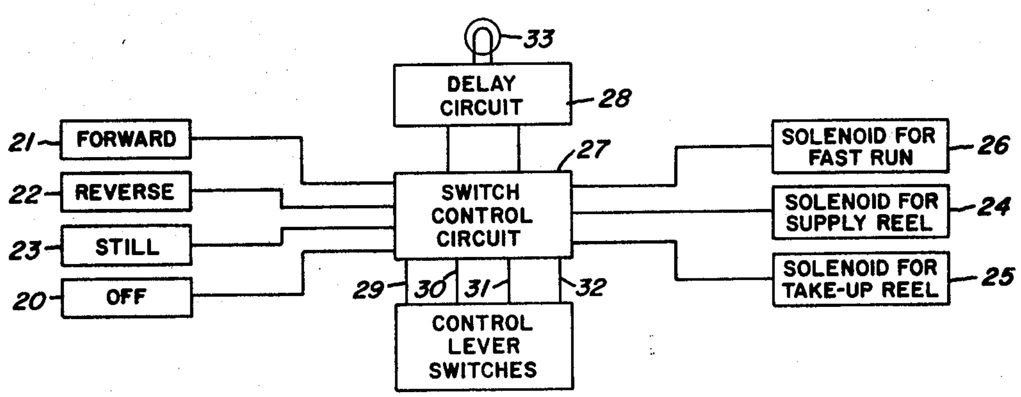
FIG. 4.
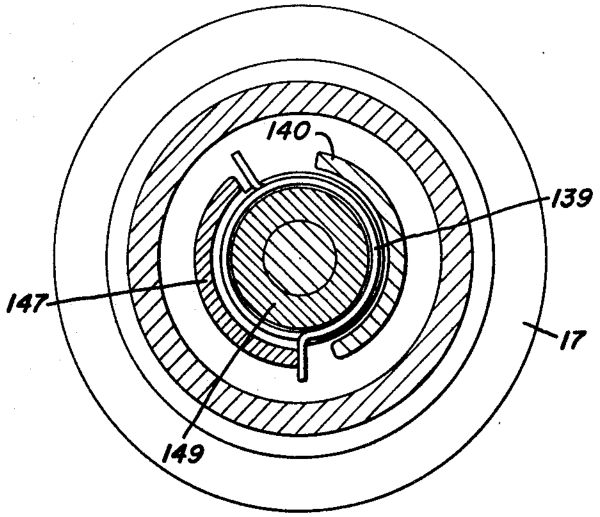
FIG. 16.

SLOT LOAD PROJECTOR

THE INVENTIVE IMPROVEMENT

A pending U.S. Pat. application Ser. No. 146,225 entitled, SLOT LOAD PROJECTOR, and assigned to the owner of this application, showed a basic slot load system for a motion picture projector using edgewise insertion of a filmstrip into a slot for quick and efficient loading. Its control system was generally mechanical and included push button switches for "off" and "run", a main control lever having three positions for forward, reverse, and load/rewind, and a rewind lever having two positions.

This invention simplifies the control system of a slot load projector to make it easier to operate. The invention also recognizes a simple way to achieve fast forward running to advance quickly to any desired place on a filmstrip. The invention increases the functional capacity of the machine while simplifying the control system structure for economy of manufacture, and the invention aims at easier operation, greater reliability and convenience, and improved efficiency.

SUMMARY OF THE INVENTION

The invention applies to a slot load motion picture projector having a reversible drive train, a feed sprocket, a take-up sprocket, a film gate, a supply reel drive, a take-up reel drive, a slot for edgewise loading of a filmstrip into the projector, and a control mechanism responsive to a control lever. The control mechanism opens the gate and clears the sprocket for loading, unloading, and fast running of the filmstrip when the control lever is in a first position, and it closes the gate, wraps the sprockets, and forms loops for projection from the filmstrip when the control lever is in a second position. The improved control system for such a projector includes switches independent of the control lever for selecting forward and reverse operation of the drive train, means responsive to the switches and the second position of the control lever for selectively connecting one of the reel drives to the drive train for winding up the filmstrip during both forward and reverse projection drive, means responsive to the switches and the first position of the control lever for selectively connecting one of the reel drives to the drive train for winding up the filmstrip during a fast run, and means for selectively braking the unwinding one of the reel drives upon interruption of the fast run. Hence, by simply positioning the main control lever in one of its two positions, and pressing the desired button for forward or reverse operation, the projector accomplishes forward and reverse projection and rewind and fast forward runs.

DRAWINGS

FIG. 3 is a function chart showing component conditions for various operational functions of the projector of FIG. 1;

FIG. 4 is a schematic diagram of the switch control system for the projector of FIG. 1;

FIG. 16 is a cross-sectional view of the feed sprocket as taken along the line 16 — 16 of FIG. 14;

DETAILED DESCRIPTION

The slot load projector having the inventive control system is a second generation of the projector shown in pending U.S. Pat. application, Ser. No. 146,225 as mentioned above. Some parts are identical, and many functions are similar, and a knowledge of the first generation projector aids in understanding the improved control system. The explanation of the improvement first takes up the slot load projector background, then the general function and operation of the improved control system, and then the specifics of the control system such as control lever functions, reel drives, footage counter, and feed sprocket loop formation.

SLOT-LOAD PROJECTOR BACKGROUND

Figure 1:
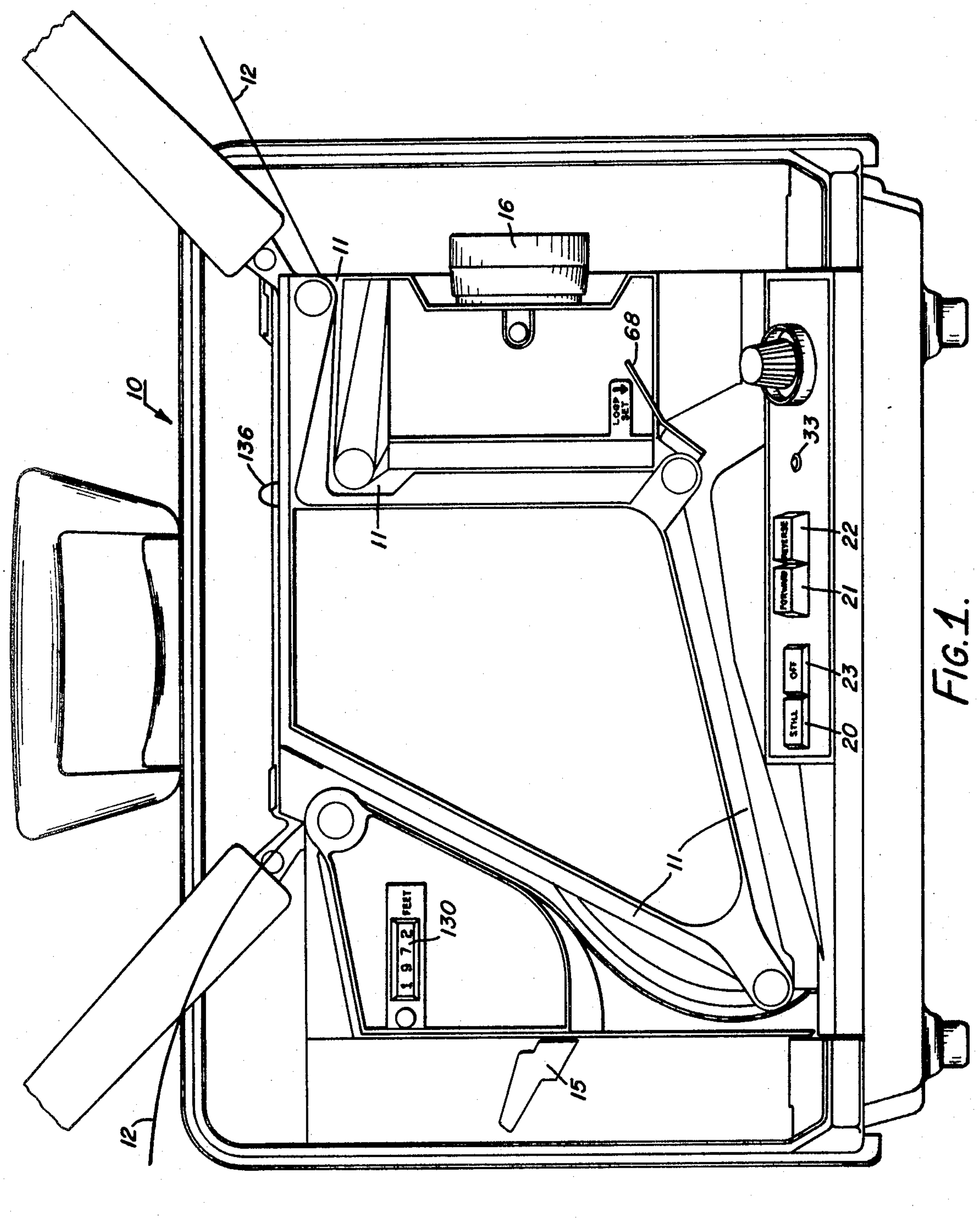
FIG. 1 is a side elevational view of a preferred embodiment of the inventive projector.
Figure 2:
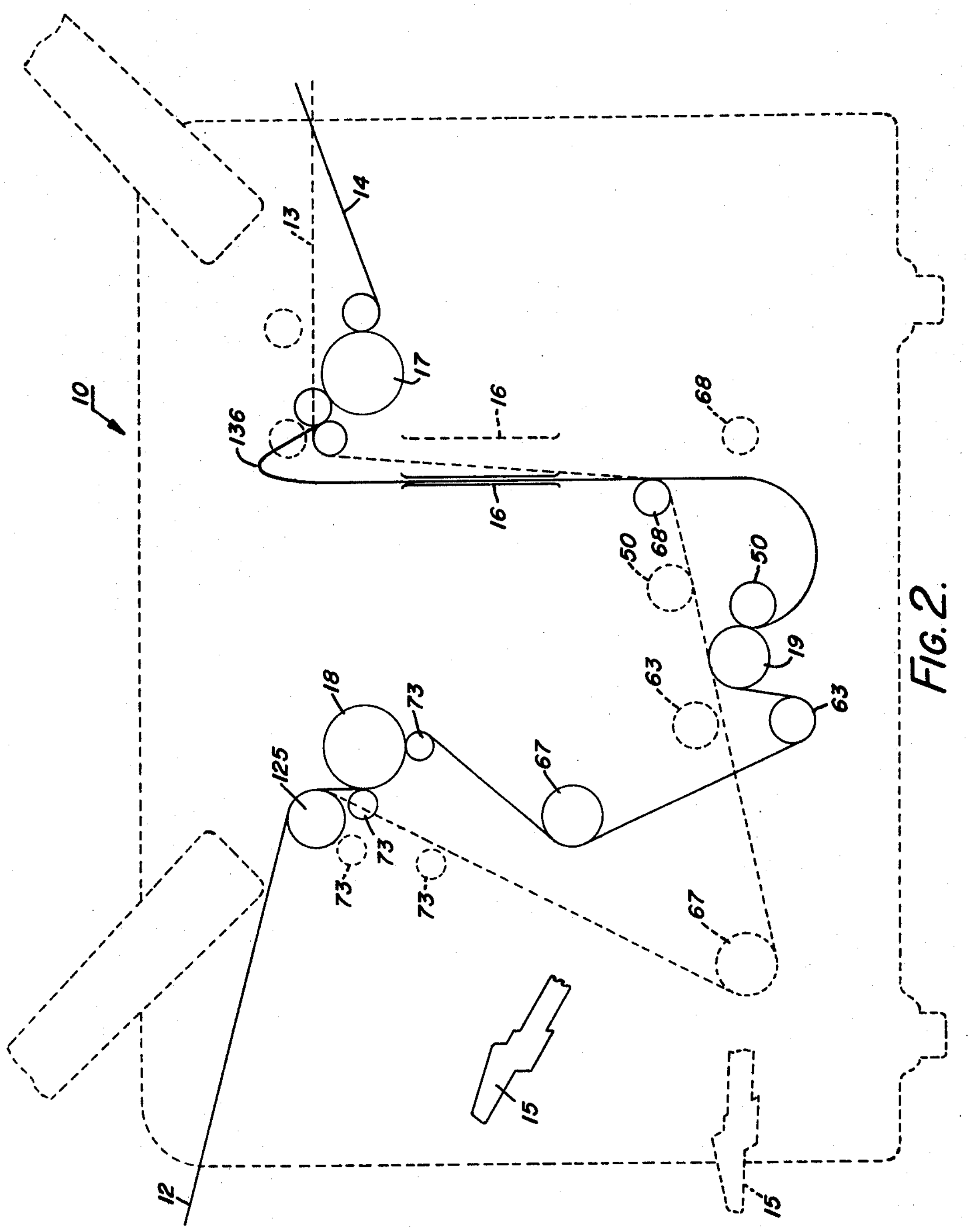
FIG. 2 is a partially schematic, elevational view of the two filmstrip paths through the projector of FIG. 1.

FIGS. 1 and 2 best show the slot-load operation of projector 10. A slot 11 opens along the face of projector 10 as illustrated in FIG. 1 so that the leading end of filmstrip 12 can be moved, edgewise into slot 11, generally following the broken-line path 13 of FIG. 2. A little tensioning makes filmstrip 12 slide fully into slot 11 to conform to path 13. In such open-slot condition, main control lever 15 is in its lowermost position, film gate 16 is open, feed sprocket 17, and take-up sprocket 18 are cleared, and sound drum 19 is unwrapped. This allows loading, unloading, rewinding and fast forward running with filmstrip 12 following path 13 clear of sound drum 19 and sprockets 17 and 18. Moving control lever 15 to its upper position, generally moves filmstrip 12 to the solid-line path 14 shown in FIG. 2 and forms loops and wraps sound drum 19 and sprockets 17 and 18 for projection runs either forward or reverse.

The invention involves an improved control system for accomplishing all the desired functions merely by correctly positioning lever 15 and operating a pushbutton switch. This is generally explained in the next section, and the details follow.

CONTROL SYSTEM GENERALLY

The operational chart of FIG. 3 shows the functions achieved by the inventive control system and the components operated for each function. These functions preferably include: forward and reverse projection as shown in the first two vertical columns; fast forward run and rewind or fast reverse run as shown in the next two columns; and brake applications following the interruption of fast forward or rewind run as shown in the last two vertical columns. Besides these functions, load and unload is accomplished manually with control lever 15 down.

Figure 9:
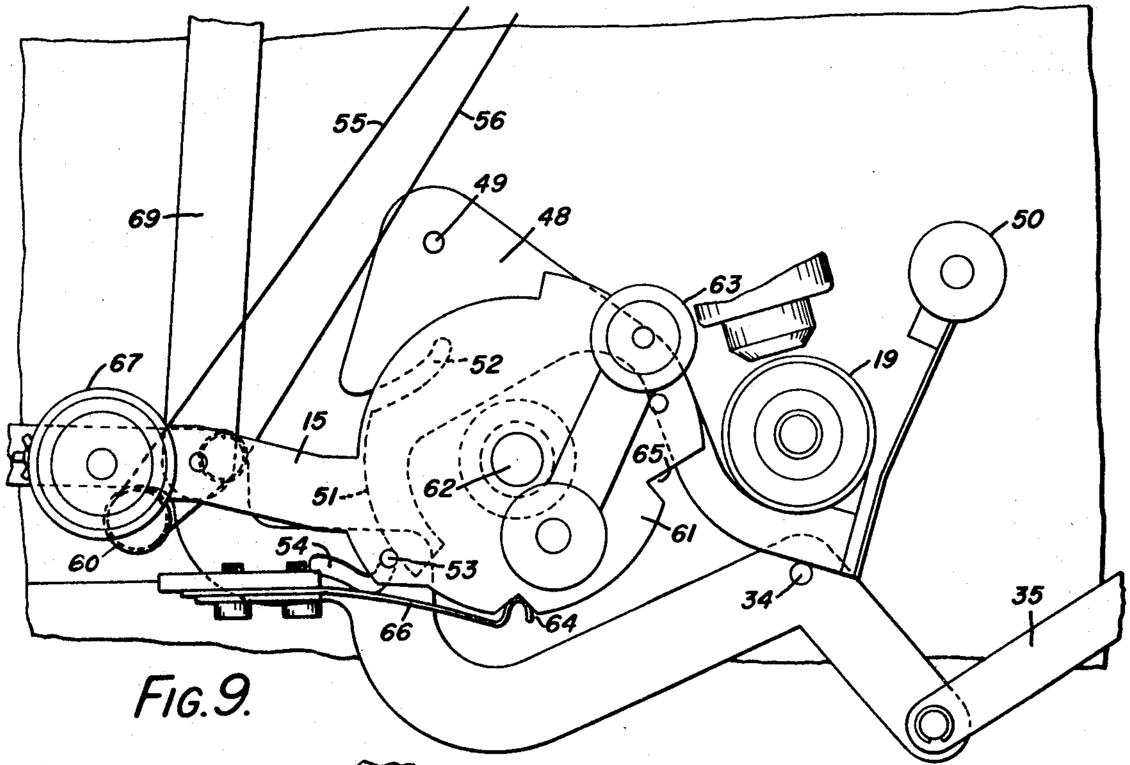
FIGS. 9 and 10 are fragmentary, elevational views of the combination of some of the operations shown in FIGS. 5 – 8 as related to the main control lever.
Figure 10:
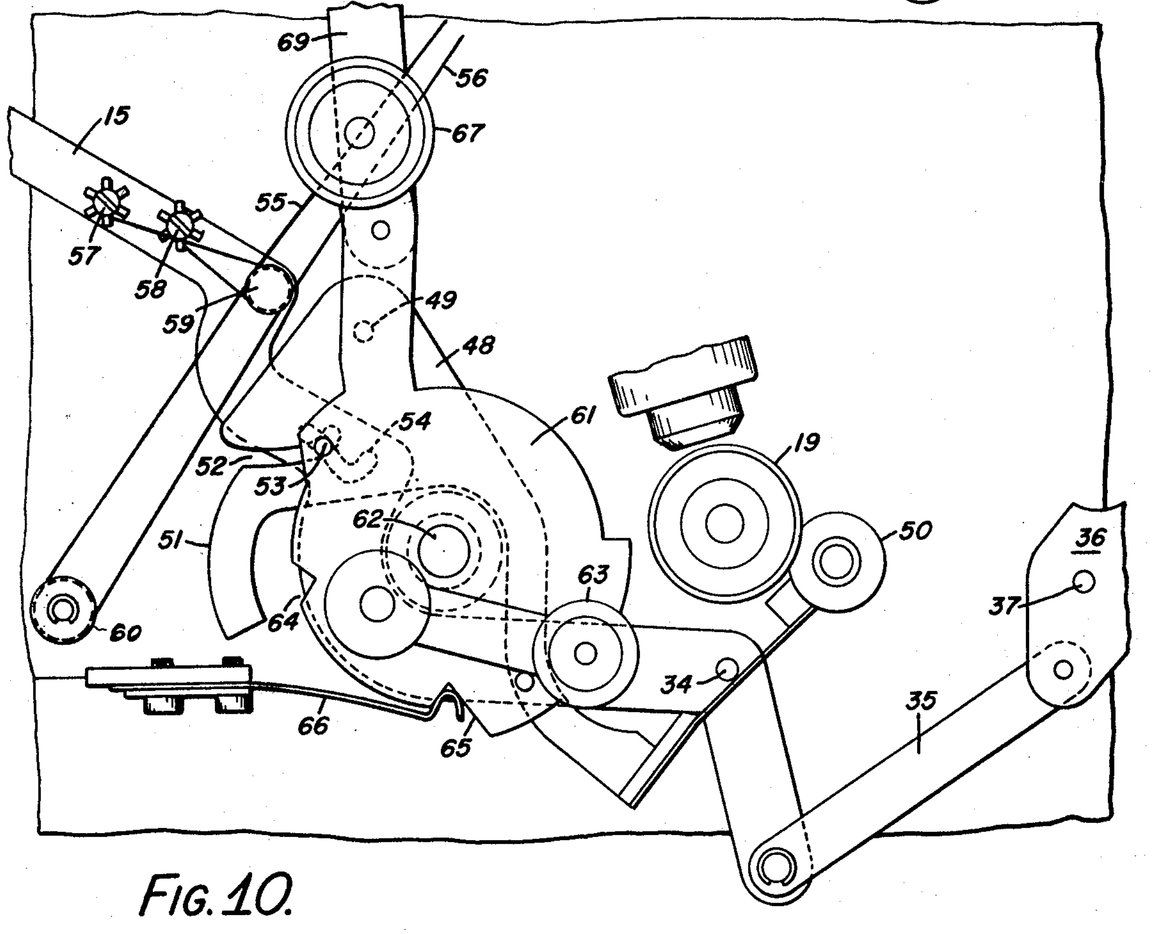
Figures 11, 17, 18:
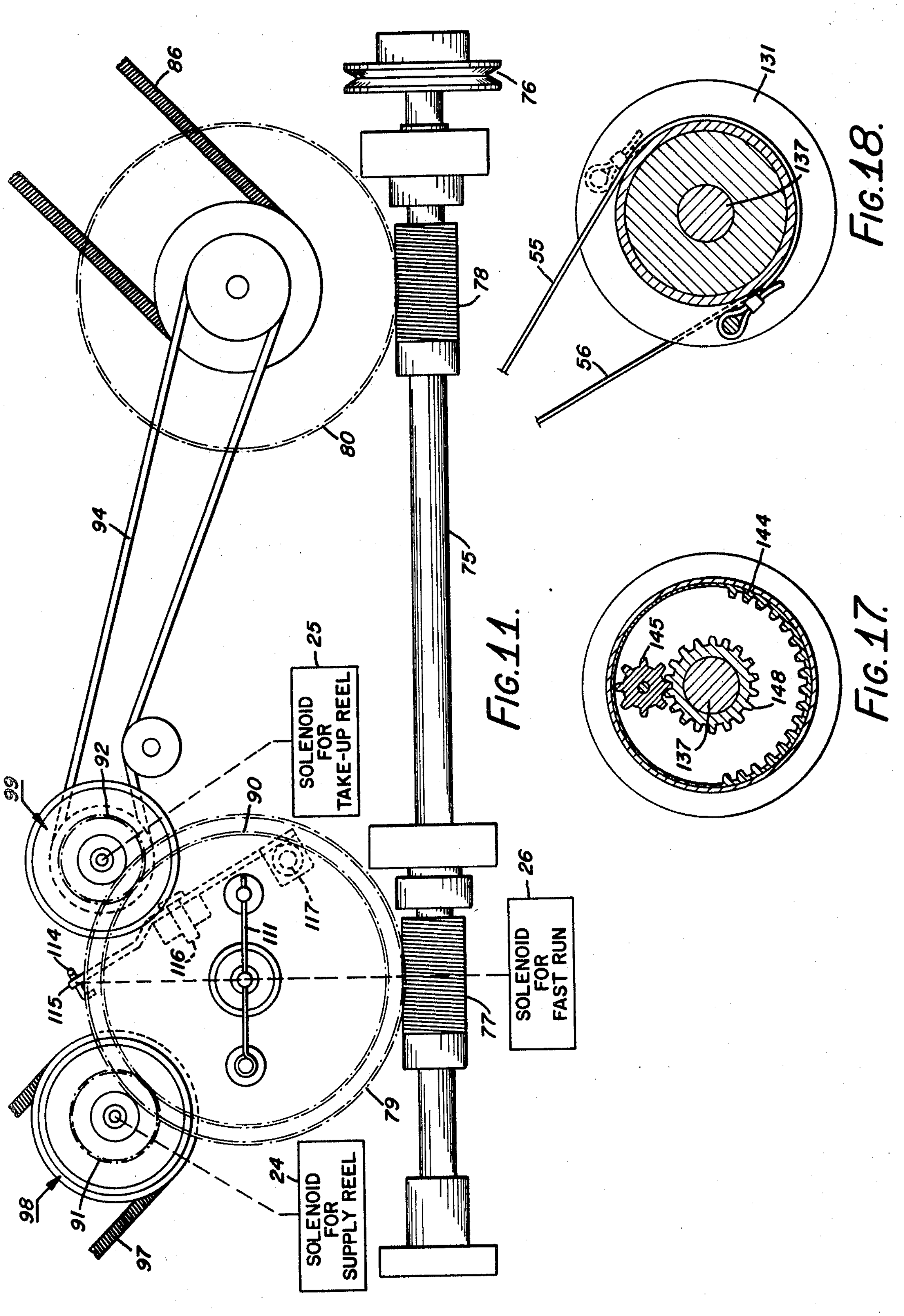
FIG. 11 is a partially schematic, fragmentary, elevational view of preferred reel drives for the projector of FIG. 1.
FIG. 17 is a cross-section of that feed sprocket loop former gear train taken on the line 17 — 17 of FIG. 14.
FIG. 18 is a cross-section of the loop forming cable drum as taken along the line 18 — 18 of FIG. 14.
Figure 14:
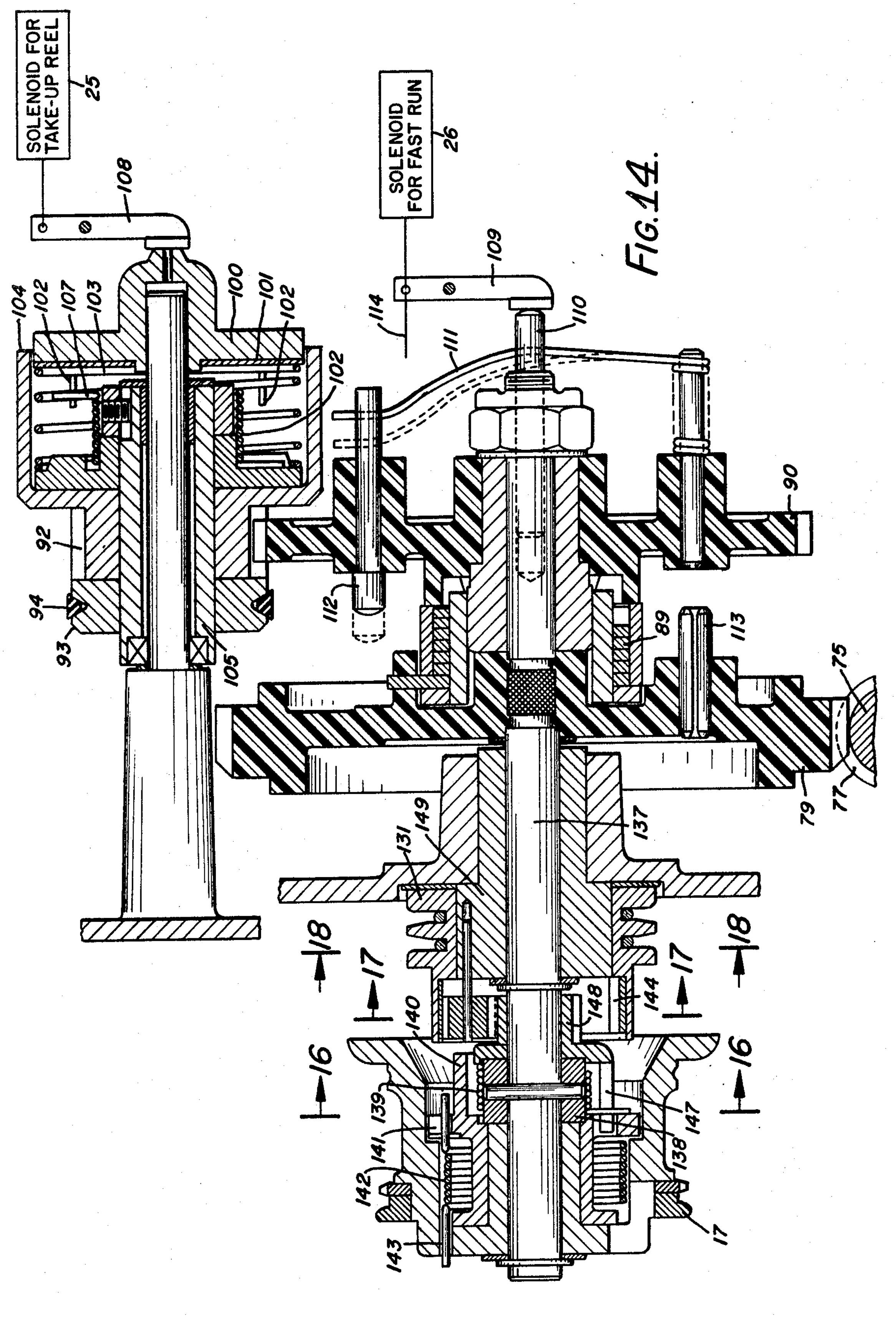
FIG. 14 is a fragmentary, cross-sectional view of the feed sprocket and supply-reel drive for the projector of FIG. 1 as taken along the line 14 — 14 of FIG. 20.

Of the various components involved in each function, the up and down positions of control lever 15 are best shown in FIGS. 2 and 6 – 10, the forward, reverse, still and off buttons 20 – 23 are best shown in FIGS. 1 and 4, and the supply reel drive solenoid 24, the take-up reel drive solenoid 25, and the fast run drive solenoid 26 are best shown in FIGS. 4, 11, and 14.

Fast-forward, rewind, and reel-braking also occurs with control lever 15 down, and forward and reverse projection drive occur with control lever 15 up. The forward button is engaged for forward projection drive or fast-forward run, and the reverse button is engaged for reverse projection drive or rewind. The still and off buttons have a similar effect in stopping the projector drive and applying reel brakes after fast forward or rewind runs; but the still button leaves on the projector lamp and fan, and the off button shuts these off.

The solenoids in the last three lines of the FIG. 3 chart are involved with supply and take-up reel drives and braking. Generally, the take-up reel drive is driven off the main projector drive through a friction clutch to take up the film that passes through projector 10 in forward projection drive, and the supply reel drive is engaged through its solenoid and driven through a slip clutch to take up the film that passes through projector 10 in reverse projection drive. For fast running in either forward or reverse, the fast run solenoid is engaged for direct drive of the supply and take-up reel drives at fairly high speed, and the take-up reel drive solenoid is engaged for fast forward and the supply reel drive solenoid is engaged for rewind. For an interval after interruption of fast run drive in either forward or reverse, the previously unwinding reel drive is braked to prevent spilling the film. This braking is accomplished by connecting the appropriate reel drive to the fast forward drive train to stop the reel drive belt and brake the film reel. Hence, on interruption of a fast forward run, the supply reel drive solenoid is engaged to brake the supply reel, and on interruption of a rewind run the take-up reel drive solenoid is engaged to brake the take-up reel.

The interaction of the components shown in the FIG. 3 function chart is also shown schematically in FIG. 4. Switching projector components on and off is generally known in projector control systems, and for simplicity, FIG. 4 omits most of the known and obvious switches for components such as the main drive motor, lamp, fan, shutter, sound system, etc. Also, the placement and operation of switches and connection of their contacts is well within the skill of projector engineers, so FIG. 4 illustrates switching functions schematically.

Figure 12:
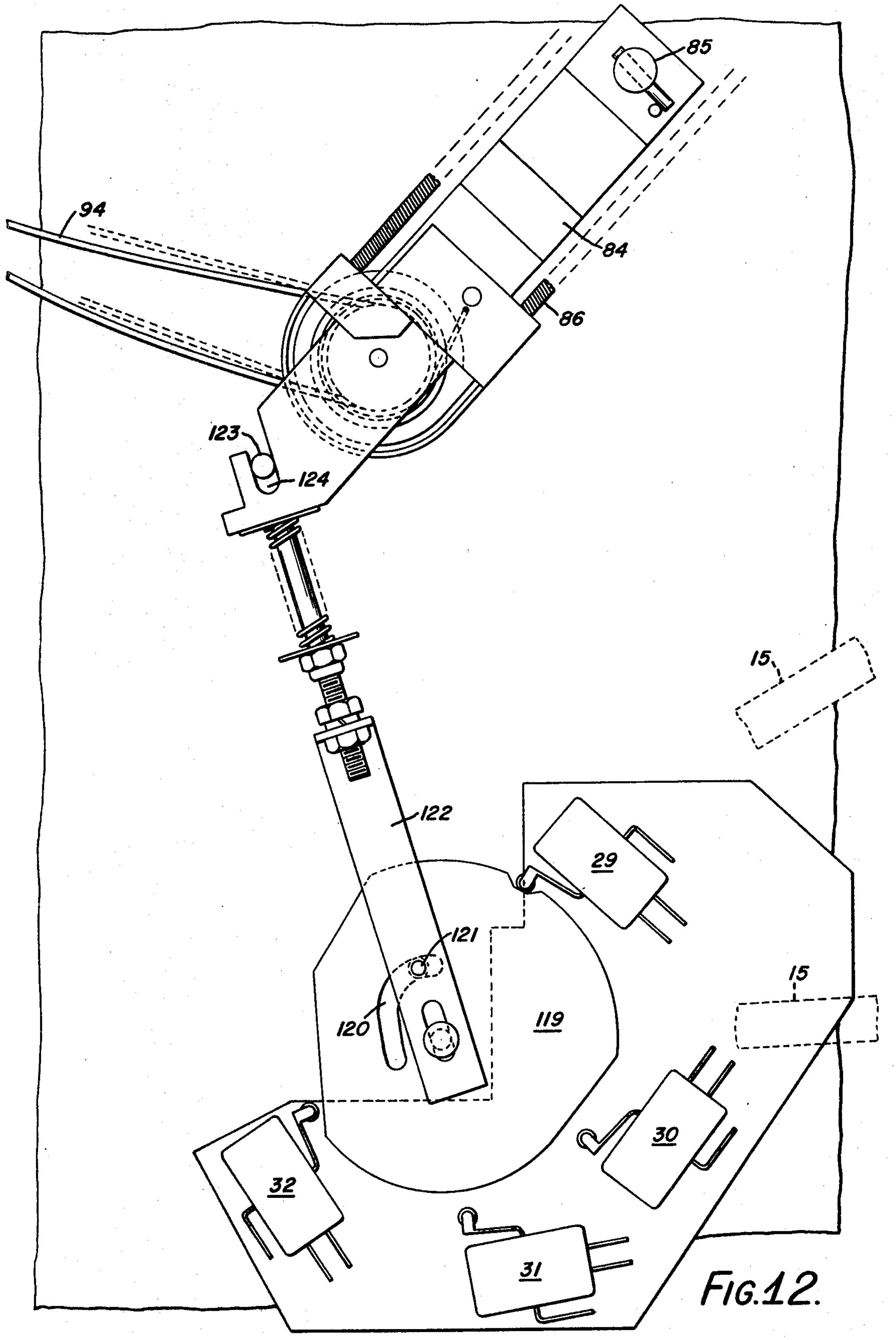
FIG. 12 is a partially schematic, fragmentary, elevational view of the take-up reel drive for the projector of FIG. 1.

Switch control circuit 27 receives imputs from manual control buttons 20 – 23 and control lever switches 29 – 32 which are also shown in FIG. 12. Circuit 27 is then responsive to the position of control lever 15 and the condition of control buttons 20 – 23, and circuit 27 cooperates with delay circuit 28 which sets a delay interval in a generally known way. Among other generally known projector functions, control circuit 27 operates solenoids 24 – 26 as previously described for fast run drive supply and take-up reel drives, and reel braking after a fast run. The details of the solenoid operations are described below under the REEL DRIVES heading.

Delay circuit 28 operates an indicator light 33 also shown in FIG. 1 to indicate to the operator that a braking delay is occurring. Such delay is preferably 4 – 6 seconds long, and through switch control circuit 27, other projector functions are inhibited while the delay elapses to ensure that the film reels are stopped without spilling film after interruption of a fast run drive before the projector is switched into another drive mode.

With this general overview in mind, the specifics of the inventive control system as described below should be easier to follow. Generally, the control lever functions will be explained first, followed by the reel drive mechanisms, the footage indicator, and the feed sprocket loop-former.

CONTROL LEVER FUNCTIONS

Figure 5:
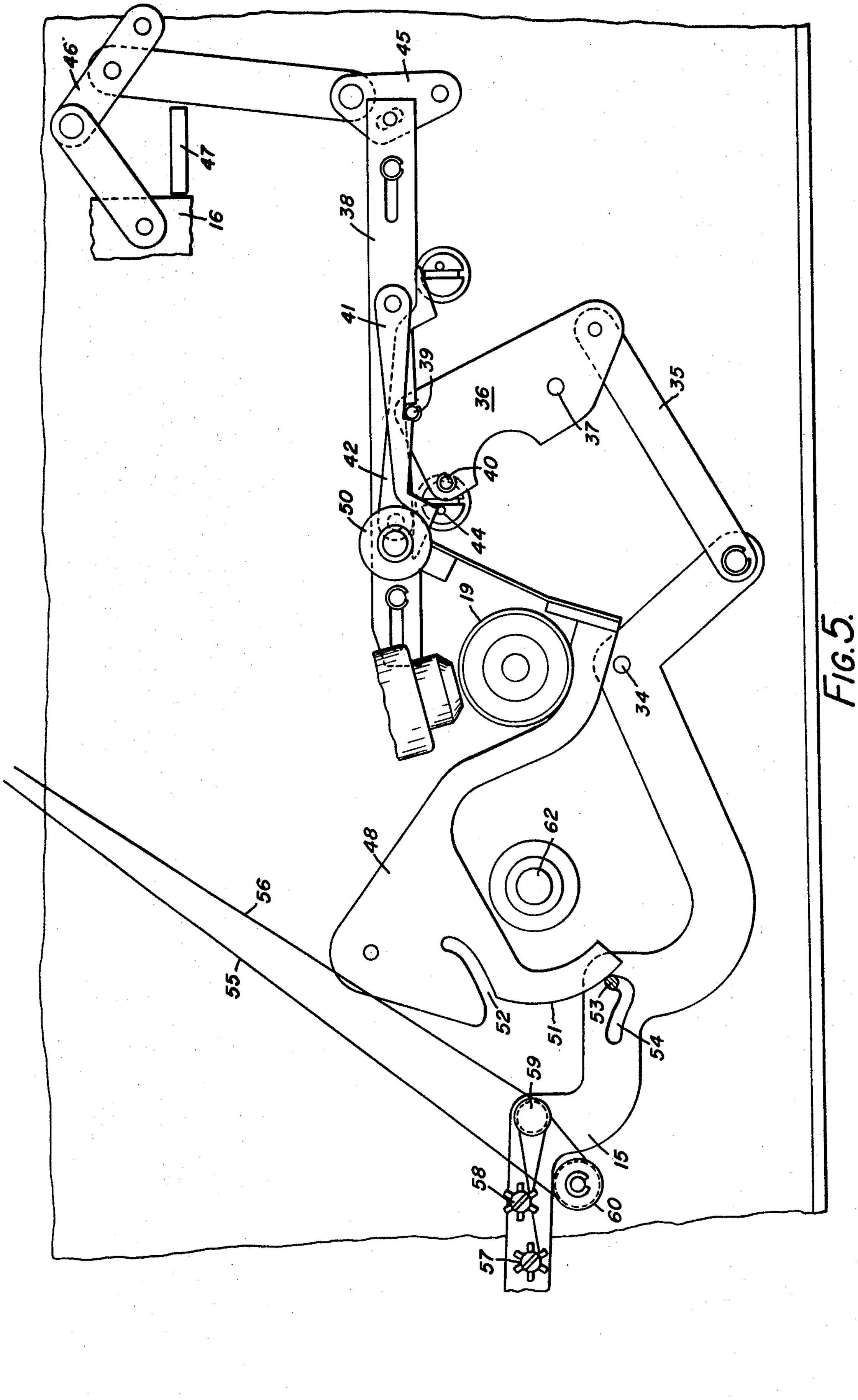
FIGS. 5 and 6 are fragmentary, elevational views of the two operating positions of the main control lever and associated equipment.
Figure 6:
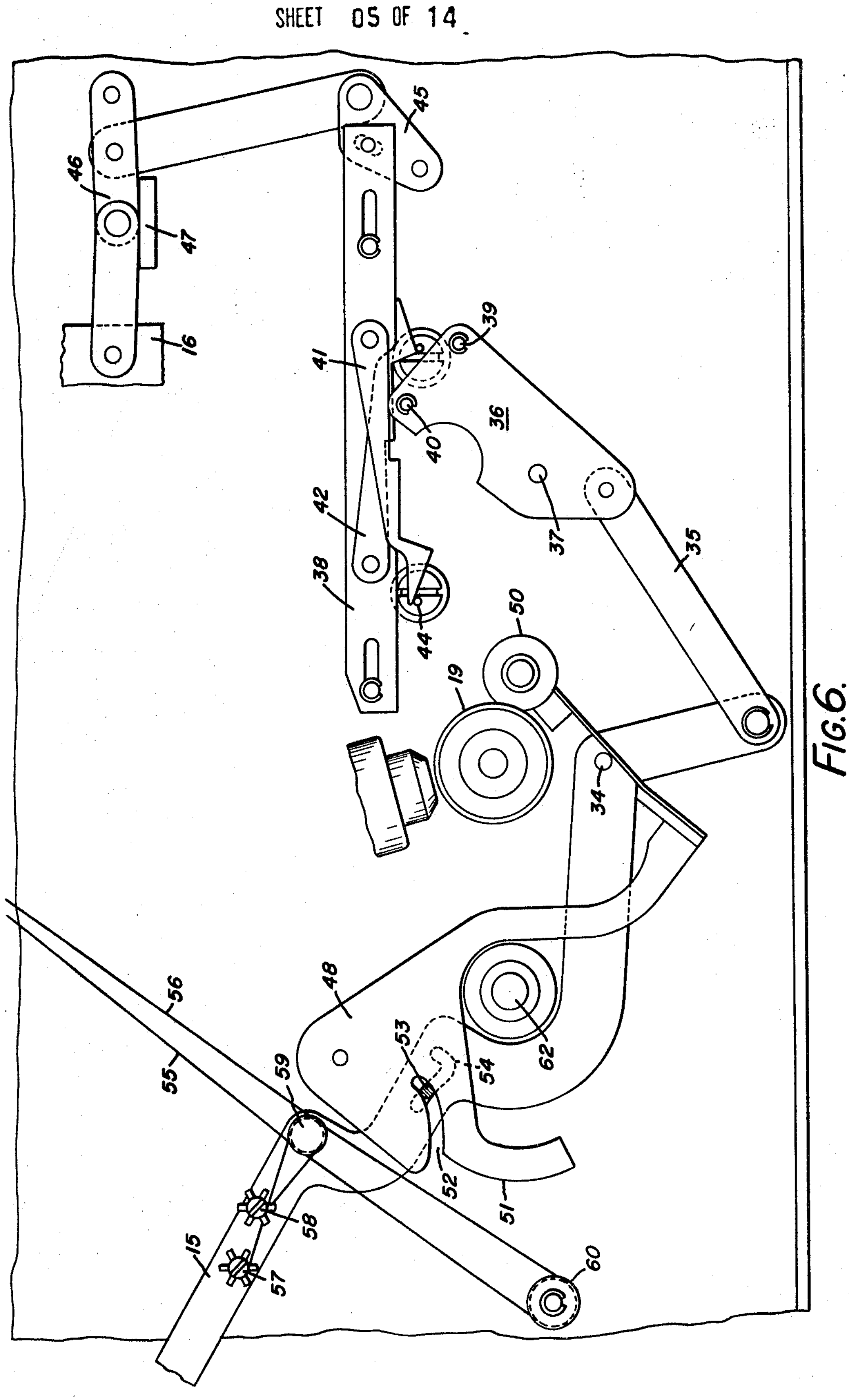

One of the functions of control lever 15 is to open and close gate 16, and the mechanism for accomplishing this is best shown in FIGS. 5 and 6. Control lever 15 turns on pivot 34 between its lower position shown in FIG. 5 and its upper position shown in FIG. 6. A connecting arm 35 joins the end of control lever 15 to a plate 36 that turns on pivot 37 to operate an actuator 38 that slides back and forth between the positions illustrated in FIGS. 5 and 6. Pins 39 and 40 on plate 36 engage notch levers 41 and 42 carried on actuator 38 for sliding actuator 38 back and forth and ensuring full movement of actuator 38 during the initial portion of the travel of control lever 15 from either its upper or lower position. For example, as control lever 15 moves upward from the position illustrated in FIG. 5, pin 39 engages notch lever 42 early in such travel and moves actuator 38 quickly to the position shown in FIG. 6. Then as the end of notch lever 42 rides up on pin 43 it disengages from pin 39 which overtravels to the position shown in FIG. 6. As control lever 15 moves downward from the position of FIG. 6, pin 40 quickly engages notch lever 41 and slides actuator 38 back to the position of FIG. 5 where the end of notch lever 41 rides up on pin 44 to release pin 40 which overtravels to the position shown in FIG. 5.

The prompt movement of actuator 38 opens or closes gate 16 and wraps or unwraps feed sprocket 17 during the initial portion of the movement of control lever 15 to leave plenty of additional control lever movement to accomplish subsequent functions. For example, after gate mechanism 16 is closed and film is wrapped over feed sprocket 17 by a pressure pad 132 (FIGS. 19 and 20), further movement of control lever 15 turns sprocket 17 to form the front loop as described below under the FEED SPROCKET LOOP FORMER heading.

Actuator 38 operates a toggle 45 which in turn operates a toggle 46 connected to gate mechanism 16 which includes a lens housing and generally-known film guides. A stop 47 limits the motion of toggles 45 and 46 in each direction. In the position shown in FIG. 5, toggle 45 is over center to brace gate mechanism 16 against any movement, and in the positions shown in FIG. 6, toggle 46 is over center for similarly bracing gate mechanism 16. This prevents filmstrip pressure or other external force from either opening or closing the film gate.

Also shown in FIGS. 5 and 6, is a plate 48 turning on pivot 49 and carrying a pressure roller 50 for wrapping and unwrapping film around sound drum 19. Plate 48 is pivoted by a follower surface 51 and slot 52 following a pin 53 that moves in a slot 54 as control lever 15 pivots. Roller 50 clears sound drum 19 when lever 15 is down in the position of FIG. 5 and wraps film around sound drum 19 when lever 15 is raised to the position of FIG. 6.

A pair of cables 55 and 56 are fastened to control lever 15 by respective stakes 57 and 58, and are wrapped in opposite ways around pulley 59, with cable 55 turning around fixed pulley 60. The effect is to tension or pull down on cable 56 and pay out cable 55 as control lever 15 is lowered, and to reverse the movement of cables 55 and 56 as control lever 15 is raised. The operation of cables 55 and 56 is described under the FEED SPROCKET LOOP FORMER heading.

Figure 7:
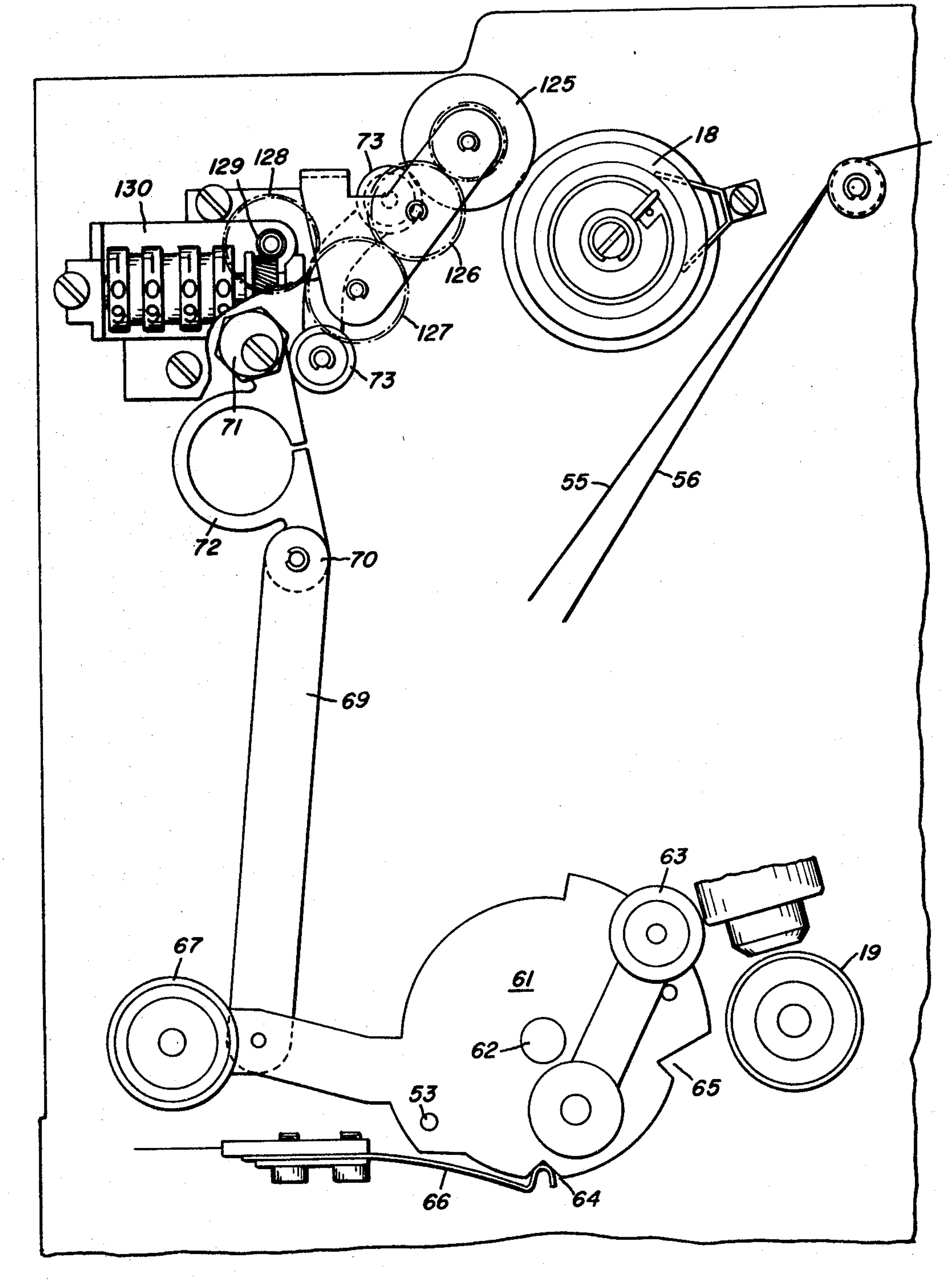
FIGS. 7 and 8 are fragmentary, elevational views of two positions of film path adjusting equipment movable with the main control lever.
Figure 8:
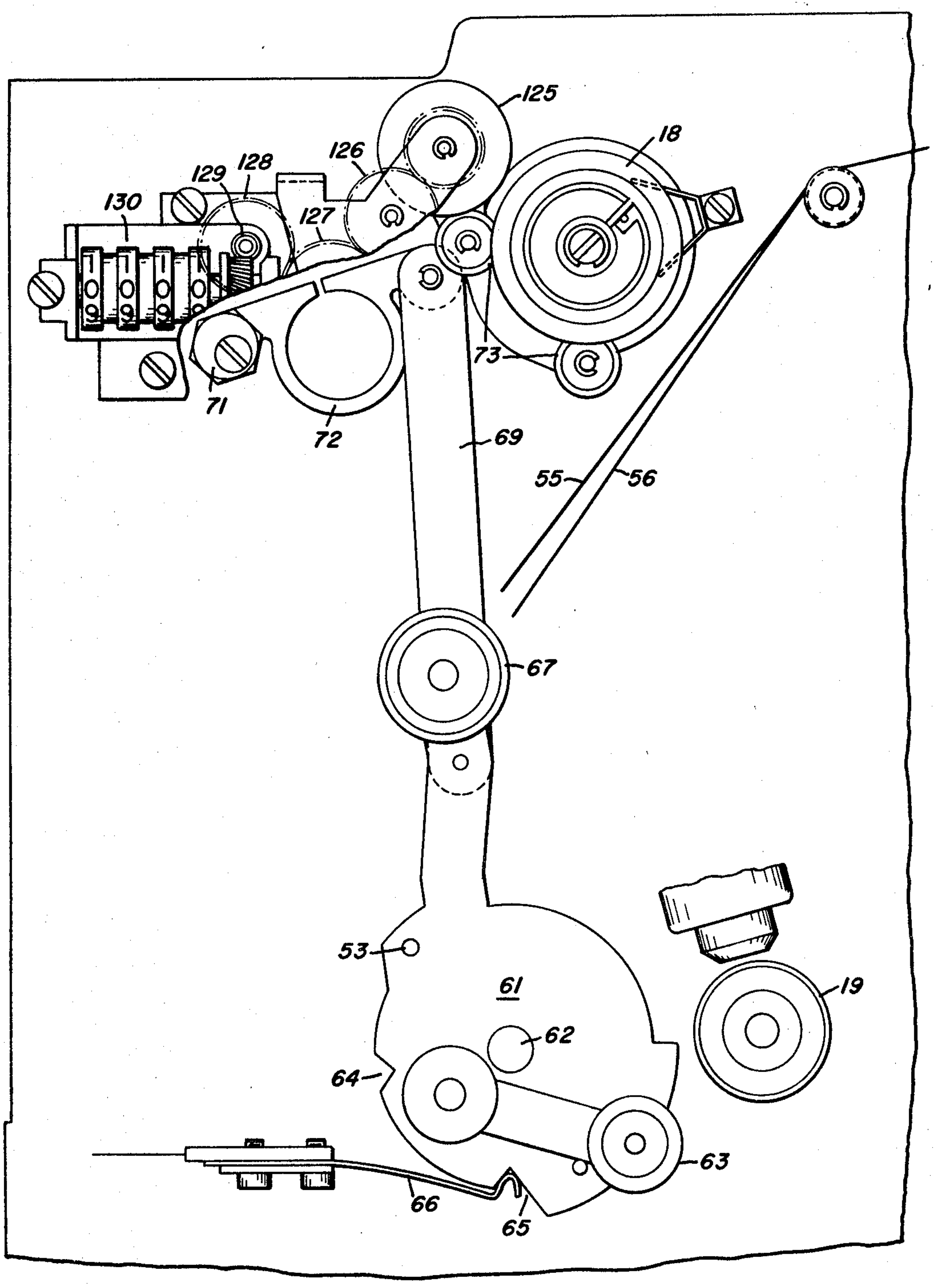

FIGS. 7 and 8 show some additional mechanisms moving with control lever 15. A plate 61 turns on pivot 62 and carries pin 53 that engages the slot 54 in control lever 15. Hence, plate 61 moves between the positions of FIGS. 7 and 8 as control lever 15 goes from its lower to its upper position. Plate 61 carries a roller 63 that cooperates with roller 50 of FIGS. 5 and 6 in wrapping and unwrapping film around sound drum 19. Plate 61 also has detent notches 64 and 65 that cooperate with a detent spring arm 66 to fix the upper and lower positions of the control arm.

Another roller 67 carried on plate 61 forms a loop of film between sound drum 19 and take-up sprocket 18. Filmstrip 12 is wrapped around roller 67 when it is loaded in slot 11 (see also FIG. 2), and when control lever 15 is raised, roller 67 is elevated to the position of FIG. 8 to produce slack in the filmstrip between sound drum 19 and take-up sprocket 18. This allows a loop of film to be driven through gate 16 before take-up sprocket 18 takes in the slack and tightens the film wrapped around sound drum 19, so that a loop is formed between gate 16 and sound drum 19. A loop former 68 can be manually operated to restore this loop if it is lost.

A connecting leg 69 extends upward from plate 61 to a knee 70 connected to a pivot 71 by a spring link 72. As control lever 15 raises, link 69 lifts to drive knee 70 upward to pivot pressure pad rollers 73 into engagement with take-up sprocket 18 to wrap and hold the filmstrip on sprocket 18. As control lever 15 lowers, pressure rollers 73 follow knee 70 and spring link 72 downward to clear filmstrip 12 from take-up sprocket 18.

FIGS. 9 and 10 combine many of the mechanisms shown in FIGS. 5 – 8 and show their connection to control lever 15. The pin 53 carried by plate 61 follows control lever 15 in slot 54 as control lever 15 moves up and down on pivot 34, and pin 53 extends through slot 54 to engage and pivot plate 48 along follower surface 51 and slot 52 as described. The complete change of position of these mechanisms between the down and up control lever positions is shown respectively in FIGS. 9 and 10.

REEL DRIVES

Figures 13, 15:
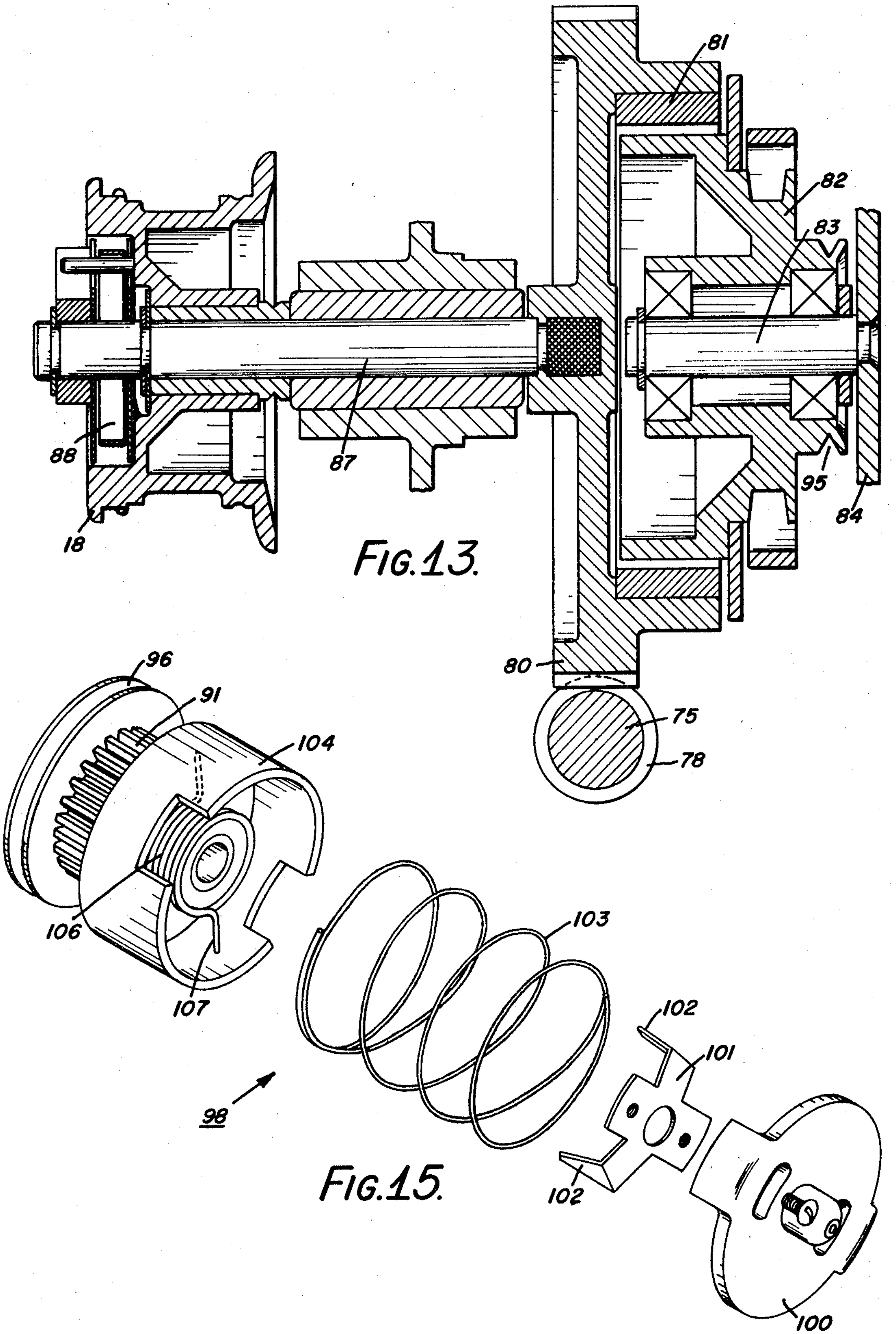
FIG. 13 is a fragmentary, cross-sectional view of the take-up sprocket and take-up reel drive for the projector of FIG. 1.
FIG. 15 is an exploded perspective view of a clutch assembly for the supply reel drive.

Supply and take-up reel drive and brake mechanisms are shown in FIGS. 11 – 15. A motor drives shaft 75 through a pulley 76, and among other things, shaft 75 turns worm gears 77 and 78 respectively meshing with gears 79 and 80. Gear 80 operates the take-up reel drive, and as shown in FIG. 13, carries a cup-shaped friction pad 81 that turns pulley wheel 82 in a friction drive. Wheel 82 is on a shaft 83 that can move eccentrically to gear 80, because shaft 83 is on take-up reel support arm 84 that turns on pivot 85 as shown in FIG. 12. The weight of the take-up reel on arm 84 tends to pivot arm 84 clockwise to press pulley wheel 82 against friction pad 81 for a friction drive between gear 80 and belt 86 to the take-up reel, and such friction drive becomes more positive as the take-up reel weight increases.

Figure 21:
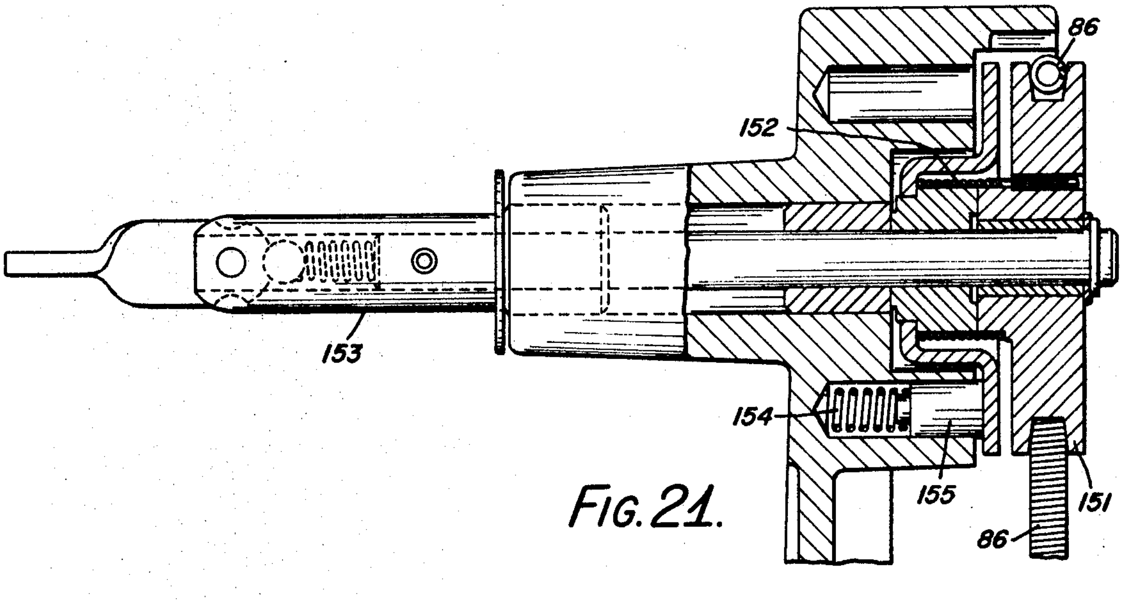
FIG. 21 is a fragmentary, cross-sectional view of a portion of the take-up reel drive of the projector of FIG. 1.

Gear 80 also turns take-up sprocket 18 on shaft 87 as shown in FIG. 13, with a spring coupler 88 connecting sprocket 18 to shaft 87. The take-up reel spindle (best shown in FIG. 21) includes a pulley 151 driven by spring belt 86 and a one-way, wrap-spring clutch 152 transmitting the drive from pulley 151 to take-up reel spindle 153. Clutch 152 is oriented to drive in the forward mode through gear 80, friction pad 81, and pulley wheel 82, and to slip in reverse. A friction pad 155 biased by spring 154 applies a slight drag to spindle 153 in reverse, and when belt 86 stops on interruption of rewind drive, clutch 152 applies such braking force to spindle 153.

Gear 79 turns at the same speed as gear 80 for driving feed sprocket 17 as explained below, and for cooperating with the reel drives. Gear 79 turns a wrap spring slip clutch 89 that connects to a gear 90 concentric with gear 79. Gear 90 meshes with a supply reel drive gear 91 and a take-up drive gear 92 each of which are part of clutch assemblies 98 and 99 described below and best shown in FIG. 15. The supply reel drive clutch assembly 98 shown in FIG. 15 is identical to the take-up reel drive clutch assembly 99 except for the turn of a wrap spring and the form of drive pulley. The take-up reel clutch assembly 99 is shown in cross section in FIG. 14 and carries a V-belt pulley 93 driving a V-belt 94 to another pulley 95 integral with pulley wheel 82 driving take-up belt 86. The supply reel drive clutch assembly 98 shown in FIG. 15 carries a pulley 96 that drives a belt 97 for the supply reel.

Supply reel clutch assembly 98 is operated by supply reel solenoid 24 previously discussed relative to FIG. 4 and the chart of FIG. 3. Similarly, take-up reel clutch assembly 99 is operated by take-up solenoid 25 also discussed above. Actuation of solenoids 24 and 25 generally makes a positive connection between respective gears 91 and 92 and respective pulleys 96 and 93 so that if solenoid 24 is actuated, pulley 96 turns with gear 91 to drive supply reel belt 97, and if solenoid 25 is actuated, pulley 93 turns with gear 92 to drive belt 94 to turn pulley 82 for the take-up reel drive.

The way this works is best shown in FIGS. 14 and 15. A movable end cap 100 for each of the assemblies 98 and 99 carries a cam member 101 having a pair of cam ears 102. A spring 103 biases end cap 100 axially outward from a cup 104 integral with gear 91 or 92. The respective pulley 96 or 93 is connected to a sleeve 105 extending into cup 104 and through the turns of a wrap spring clutch 106 which has one end anchored in cup 104. The free end 107 of wrap spring 106 is engaged by one of the cam ears 102 for tightening onto sleeve 105 to form the connection between driven cup 104 and pulley sleeve 105.

Assemblies 98 and 99 differ only in pulleys 96 and 93, and in the wrap direction of spring 106. The two cam ears 102 on cam member 101 are arranged so that one cam ear 102 is operable for each of the assemblies 98 and 99. This reduces the number of parts and simplifies the construction. In operation, when solenoids 24 or 25 are actuated, they force levers 108 against end caps 100 to drive cam ears 102 axially into cups 104 and against the free ends 107 of wrap springs 106. Such motion twists and tightens wrap springs 106 as their free ends 107 are moved on the cam incline of ears 102 so that wrap springs 106 tightly engage sleeves 105 to connect pulleys 96 or 93 to driven cup 104. When solenoids 24 and 25 are unenergized, springs 103 push end caps 100 out of cups 104 and release the connection to pulleys 96 and 93.

Fast run solenoid 26 operates a lever 109 to push an axially movable pin 110 inward against cantelever spring arm 111 as best shown in FIG. 14. The free end of spring 111 moves pin 112 axially to its broken line position where it will engage a pin 113 on gear 79 so that gear 90 turns positively with gear 79. This overrides the slip connection afforded by wrap spring 89 between gear 79 and 90.

When solenoid 26 operates, it also pulls on a cable rod or wire 114 that connects to a lever 115 supported on pivot 116 as best shown in FIG. 11. The other end of lever 115 carries a pin 117 that moves to interfere with a cam 118 shown in FIGS. 19 and 20 as moving with gate mechanism 16 in response to control lever 15. Pin 117 then prevents movement of cam 118 and in turn blocks movement of control lever 15 from its lower position. This prevents the operator from raising control lever 15 when solenoid 26 is energized for fast run.

Another feature of the reel drive mechanisms is best shown in FIG. 12. Cam plate 119 rotates with control lever 15 through a connection with plate 61 which is best shown in FIGS. 7 and 8, so that cam 119 moves between two positions as control lever 15 is shifted. Cam 119 has a cam slot 120 followed by a pin 121 on an arm 122 so that arm 122 raises and lowers as cam 119 rotates. The upper end of arm 122 has a hook 123 lodged in a slot 124 in the lower end of take-up reel arm 84.

As illustrated in FIG. 12, cam 119 is positioned for forward or reverse projection drive, with hook 123 loose in slot 124. If control lever 15 moves to its lower position for fast run, cam 119 rotates clockwise as viewed in FIG. 12 so that slot 120 pulls pin 121 downward to lower arm 122 and pull down on the lower end of take-up reel support arm 84. This disengages the friction clutch best shown in FIG. 13 between pulley wheel 82 and gear 80 by centering pulley wheel 82 with gear 80. It also tensions V-belt 94 leading from take-up drive clutch assembly 98 to establish a direct drive to the take-up reel.

The operation of the reel drive was explained above in reference to FIG. 4 and the chart of FIG. 3. Now that the specific reel drive mechanisms have been explained, this operation is reviewed below.

For forward projection drive, none of the solenoids 24 – 26 is energized, and the only reel drive operating is the take-up reel drive through friction pad 81 giving a slip drive for gently taking up the film that passes through projector 10. For reverse projection drive, solenoid 24 is energized to connect pulley 96 to gear 91 for driving supply reel belt 97. However, fast-run solenoid 26 is not engaged, so that gears 79 and 90 are connected only through slip clutch 89, and supply reel belt 97 is driven in a gentle, slipping manner to take up film passing back through projector 10.

For fast forward run, control lever 15 is in its lower position to pull down on the lower end of take-up reel support arm 84 for disengaging the friction clutch drive between gear 80 and pulley wheel 82 and for tightening belt 94. Also, solenoid 26 is energized for fast run by moving pin 112 to interlock gear 90 with gear 79 and for blocking movement of control lever 15 by tensioning wire or rod 114 to drive pin 117 into blocking position. Solenoid 25 is also energized to move end cap 100 to engage the wrap spring 106 in take-up clutch assembly 99 so that V-belt pulley 93 turns with gear 92 and drives belt 94 to pulley 95 on pulley wheel 82. This establishes a high-speed, positive drive through belt 86 to the take-up reel for fast forward run. For rewind or fast reverse run, solenoid 26 is energized as just described, and solenoid 24 is energized to move the end cap 100 of clutch assembly 98 to tighten its wrap spring 106 for driving pulley 96 with gear 91 for a positive and rapid drive of supply reel belt 97.

The proper switching of solenoids 24 – 26 is accomplished by switching circuit 27 of FIG. 4 with the input from switch buttons 20 – 23 and from control lever switches 29 – 32 operating on cam 119 as shown in FIG. 12. Switch 29 changes state as soon as cam 119 moves from either rest position, and switch 29 serves to shut off the drive train when control lever 15 is intermediate its operating positions. Switches 30 – 32 change state between the upper and lower positions of control lever 15, and do so at slightly different times. The combination of switches 29 – 32 and switches 20 – 23 is sufficient input to control circuit 27 to accomplish all the functions set out in the FIG. 3 chart and explained herein. Those skilled in the art will understand the desired switching along with other projector switching requirements such as motor, lamp fan, sound system, etc.

If a fast forward run is interrupted, delay circuit 28 of FIG. 4 works in cooperation with control circuit 27 to energize a supply reel brake for a pre-determined interval of preferably 4 to 6 seconds. This is accomplished by de-energizing solenoid 25 and energizing solenoid 24 for respectively releasing the take-up reel drive and engaging the supply reel drive. This stops the driving force to the take-up reel, and connects the supply reel to the drive train through belt 97, gears 90 and 79, and worm gear 77. Since drive shaft 75 rapidly stops, belt 97 quickly becomes a strong braking force on the supply reel to prevent any spilling of film.

Similarly, if a rewind drive is interrupted, solenoid 24 is released to disengage the supply reel drive, and solenoid 25 is energized to connect the take-up reel drive to the main drive shaft 75 for stopping the take-up reel through belt 86. During the braking interval, indicator light 33 lights to show the operator that the projector state cannot be changed. After the braking delay interval, solenoids 24 – 26 all disengage to free the control system for selection of any desired operating mode for projector 10.

FOOTAGE COUNTER

Fast forward and reverse capacity allows a filmstrip to be run quickly to any desired position in projector 10 so projection can begin from that point. To facilitate this, a footage counter is included in projector 10 to locate a desired place on a filmstrip. The preferred footage counter is best shown in FIGS. 1, 7, and 8.

A footage counter sprocket 125 is spaced away from take-up sprocket 18 by a comfortable clearance, and as best shown in FIG. 2, is located where it always engages filmstrip 12 regardless of the position of control lever 15. Sprocket 125 is not driven, and it preferably has teeth engaging the perforations in filmstrip 12 so that the film travelling around sprocket 125 supplies the force for turning sprocket 125. Gears 126 – 128 carry the rotational motion from sprocket 125 to a worm gear 129 that drives a decimal counter 130. Counter 130 is preferably calibrated to record the filmstrip footage passing over sprocket 125, but it could also be calibrated for frames, meters, or other measurement. The numbers on counter 130 are visible to the operator as best shown in FIG. 1 so that a filmstrip can be loaded in projector 10 and advanced the desired distance before projection is begun. Having footage sprocket 125 driven by the filmstrip itself simplifies the counter mechanism which needs no connection to the projector drive train.

FEED SPROCKET LOOP FORMER

A film loop is necessary between feed sprocket 17 and gate 16, and this is formed through the cooperation of control lever 15. As previously described, cables 55 and 56 are alternately pulled and paid out as control lever 15 moves up and down, and cables 55 and 56 lead to a cable drum 131 of the loop forming mechanism best shown in FIGS. 14 and 16 – 20. Cables 55 and 56 are wrapped around drum 131 and staked in place as shown in FIG. 18 so that alternate pulling and paying out of cables 55 and 56 turns drum 131 a little more than 180° or so in either direction. Drum 131 is coaxial with and coupled to feed sprocket 17 for forming the front loop as described below.

Figure 20:
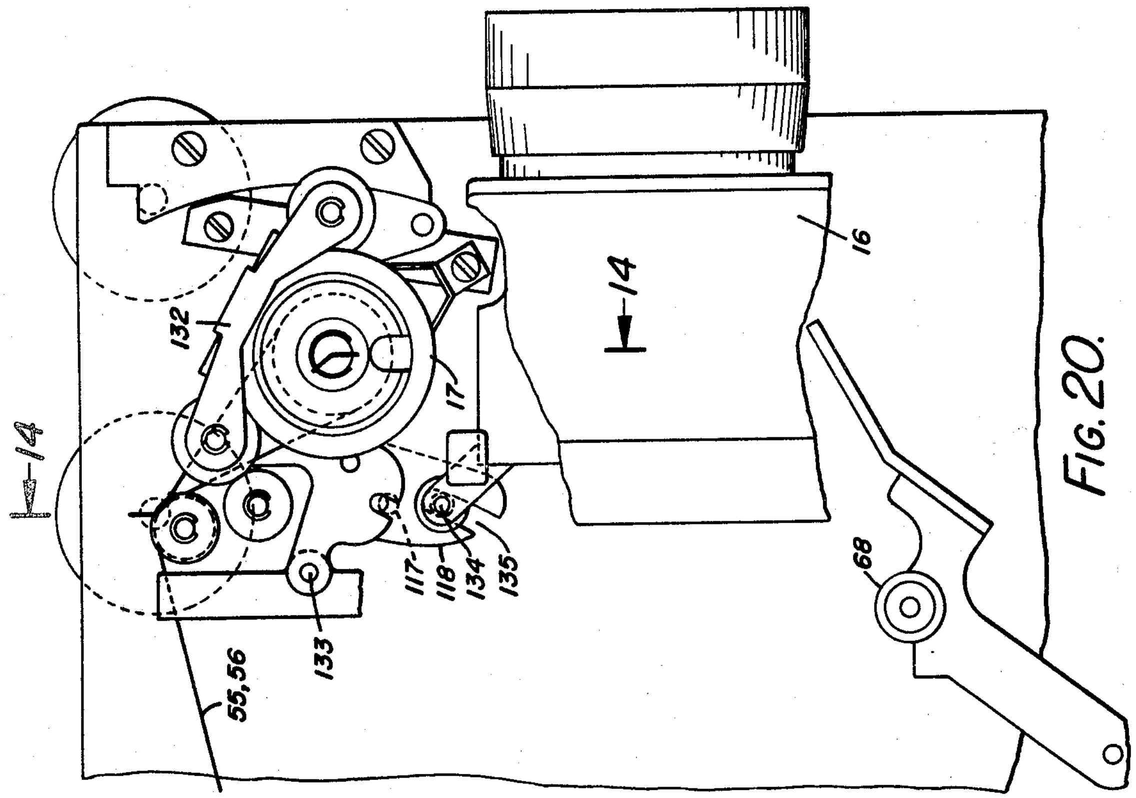
FIGS. 19 and 20 are partially schematic, partially fragmentary, elevational views of feed sprocket operation in two positions of the main control lever.
Figure 19:
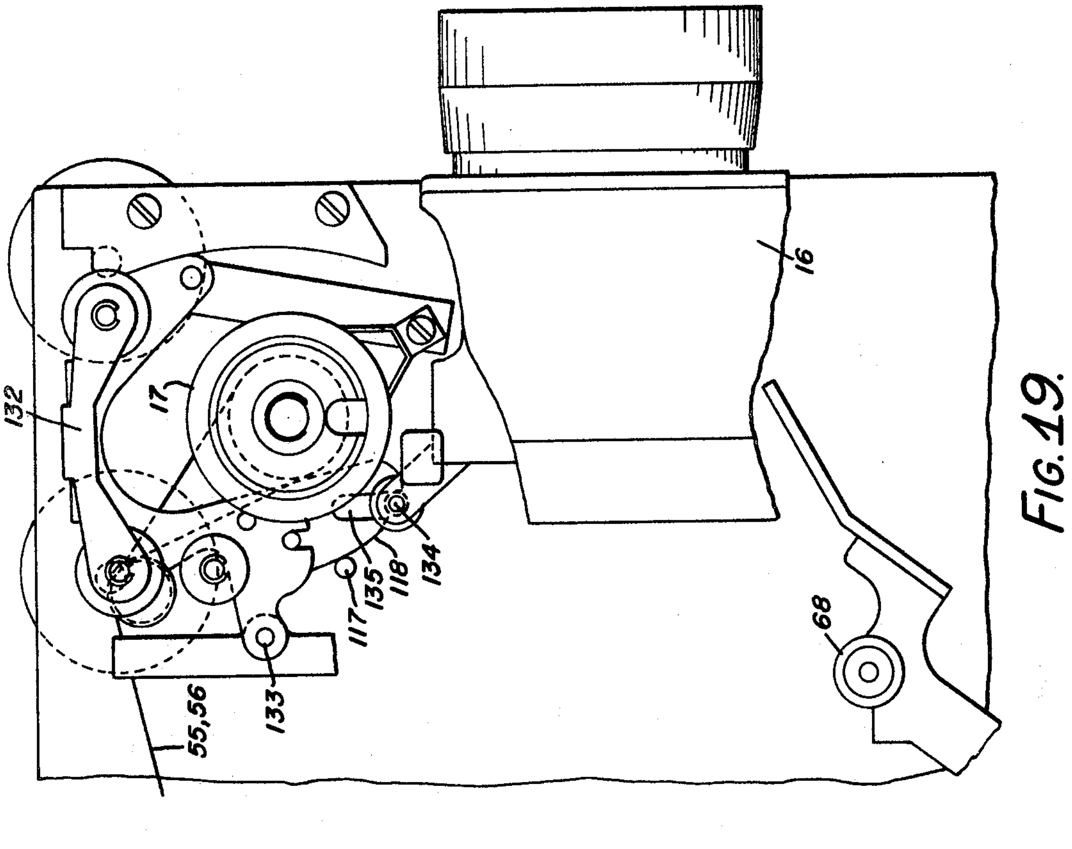

A pressure pad roller assembly 132 wraps and clears feed sprocket 17 as best shown in FIGS. 19 and 20. Pad assembly 132 turns on pivot 133 between the positions illustrated in FIGS. 19 and 20, and is moved by a pin 134 carried by gate mechanism 16 and engaging a slot 135 in a cam follower 118. As described above in reference to FIGS. 5 and 6, gate mechanism 16 opens quickly in the initial downward movement of control lever 15, and closes quickly in the initial upward movement of control lever 15. This in turn moves pressure pad assembly 132 quickly for either unwrapping and clearing sprocket 17 early in the downward motion of control lever 15, or wrapping and pressing the film around sprocket 17 early in the upward motion of control lever 15.

The front loop is formed after pressure pad assembly 132 moves downward to the position of FIG. 20 to wrap the filmstrip around front sprocket 17. The remaining upward travel of control lever 15 rotates drum 131 which rotates sprocket 17 to take in a length of film forming front loop 136 between sprocket 17 and gate 16 as shown in FIGS. 1 and 2.

Sprocket 17 is supported on shaft 137 which carries a journal 138 surrounded by the turns of a wrap spring clutch 139. Both ends of wrap spring 139 are free and extend radially outward as best shown in FIG. 16. Gear 79 drives shaft 137 and rotates wrap spring 139 so that one of its ends engages sleeve sector 140 serving as a sprocket drive. The engagement between wrap spring 139 and sleeve sector 140 is oriented to tighten wrap spring 139 for a positive engagement turning sleeve 140 with shaft 137.

For forward drive, sleeve 140 has a projection 141 engaging one end of a coil spring 142 the other end of which is secured in a bore 143 in sprocket 17 so that spring 142 serves as a resilient snubber connection between sleeve 140 and sprocket 17. For reverse rotation, sleeve 140 engages the other end of spring 142 near its engagement with bore hole 143 for a positive drive in reverse projection. Either forward or reverse rotation of shaft 137 tightens wrap spring 139 against sleeve 140 for a positive drive connection.

Drum 131 carries a ring gear 144 and turns on a sleeve 149 carrying a planetary gear 145. As best shown in FIG. 17, ring gear 144 is a sector of about 180°, and a sector cup 147 carries a sun gear 148 that meshes with planetary gear 145. When drum 131 is at a rest position with control lever 15 either up or down, planetary gear 145 is clear of ring gear sector 144 as illustrated in FIG. 17. Then, as shaft 137 turns to engage wrap spring 139 against sleeve sector 140, sector cup 147 also turns with wrap spring 139 and rotates sun gear 148 which turns planetary gear 145 in idling fashion since it is not in mesh with ring gear sector 144. This disengages drum 131 from the driving force of shaft 137.

When drum 131 rotates as control lever 15 moves between its positions, shaft 137 is stopped, and ring gear sector 144 engages and meshes with planetary gear 145 for turning planetary gear 145 and sun gear 148. This turns sector cup 147 into engagement with one of the free ends of wrap spring 139 in such an orientation as to loosen wrap spring 139 and disengage it from shaft 137. Sector cup 147 also drives the loosened end of wrap spring 139 against sleeve 140 to turn sprocket 17 on shaft 137 to form front loop 136. Drum 131 rotates far enough to drive planetary gear 145 off of ring gear sector 144 to restore the normal drum disengagement described above for allowing shaft 137 to drive.

To ensure an accurate mesh of ring gear 144 with planetary gear 145 without any tooth-to-tooth hang-up, resilient gear meshing means are preferably included. One possibility is a movable gear segment at the leading edges of ring gear sector 144 spring-biased for movement peripherally in the arc of gear sector 144; another possibility is a radially resilient segment at the leading ends of gear sector 144; and the preferred solution is to form ring gear sector 144 of resilient, deformable material so that its teeth will yield sufficiently to prevent any tooth hang-up and ensure mesh between planetary gear 145 and ring gear 144.

In effect, sprocket 17 is coupled to shaft 137 by wrap spring 139 during normal driving operations, and drum 131 is disengaged by gear 145 being out of mesh with gear 144. During movement of control lever 15 and rotation of drum 131, shaft 137 is stopped, and the gear train connection from drum 131 to sector cup 147 drives sector cup 147 to loosen wrap spring 139 and turn sprocket 17 on shaft 137 to form loop 136.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. Those skilled in the art will appreciate that many substitutions can be made in the clutches, brakes, drive trains, gear connections, etc., described above for the specific preferred embodiment. Also, the complexity of this sort of equipment allows many variations in materials and constructions to accomplish the same general effect.

I claim:

1. In a motion picture projector having: a reversible drive train; a feed sprocket; a take-up sprocket; a film gate; a supply reel drive; a take-up reel drive; a slot for edgewise loading of a filmstrip into said projector; and a control mechanism responsive to a control lever for opening said gate and clearing said sprockets for loading, unloading, and fast running of said filmstrip when said control lever is in a first position, and for closing said gate, wrapping said sprockets, and forming loops for projection from said filmstrip when said control lever is in a second position, an improved system for controlling a plurality of operations of said projector in cooperation with said control mechanism, said control system comprising:

a. switch means independent of said control lever for selecting forward and reverse operation of said drive train;

b. means responsive to said switch means and said second position of said control lever for selectively connecting said take-up reel drive to said drive train for winding up said filmstrip during forward projection drive and for connecting said supply reel drive to said drive train for winding up said filmstrip during reverse projection drive;

c. means responsive to said switch means and said first position of said control lever for selectively connecting one of said reel drives to said drive train for winding up said filmstrip during a fast run; and d. means for selectively braking the unwinding one of said reel drives for a predetermined interval upon interruption of said fast run.

2. The system of claim 1 wherein said braking means comprises means for selectively connecting said unwinding one of said reel drives to said drive train.

3. The system of claim 1 wherein said reel drive connecting means for fast run includes means for connecting said supply reel drive to said drive train for fast reverse run and means for connecting said take-up reel drive to said drive train for fast forward run.

4. The system of claim 3 wherein said braking means comprises means for selectively connecting the braked one of said reel drives to said drive train.

5. The system of claim 1 wherein said drive train includes a driving member and a driven member selectively connected to said reel drives; a slip connection between said driving member and said driven member; means for positively connecting said driven member to said driving member; and means for selectively engaging said positive connection means for said fast run.

6. The system of claim 5 wherein said driven member is driven through said slip connection in said reverse projection drive, and said supply reel drive is connected to said driven member in said reverse projection drive.

7. The system of claim 5 wherein said braking means comprises means for selectively connecting said unwinding one of said reel drives to said driven member.

8. The system of claim 7 including means for maintaining said positive connection for an interval after interruption of said fast run.

9. The system of claim 1 including a measuring sprocket engaging said filmstrip and turning as said filmstrip moves, and a counter driven by said measuring sprocket to indicate the amount of said filmstrip that has passed through said projector.

10. The system of claim 9 wherein said measuring sprocket has teeth and is turned by said filmstrip.

11. The system of claim 9 wherein said measuring sprocket engages said filmstrip in either position of said control lever.

12. The system of claim 11 wherein said measuring sprocket is arranged in the region of said take-up sprocket.

13. The system of claim 1 wherein said drive train includes a fast run drive comprising:

a. a fast run drive gear;

b. a supply reel gear meshed with said fast run drive gear;

c. a take-up reel gear meshed with said fast run drive gear;

d. a supply reel drive pulley;

e. a take-up reel drive pulley;

f. means for selectively engaging said supply reel drive pulley with said supply reel drive gear for fast reverse run; and g. means for selectively engaging said take-up reel drive pulley with said take-up reel drive gear for fast forward run.

14. The system of claim 13 wherein said selective engaging means for said supply reel drive pulley and said take-up reel drive pulley each includes a solenoid-actuated clutch.

15. The system of claim 14 wherein said solenoid-actuated clutch is a wrap-spring clutch.

16. The system of claim 15 including a pulley journal surrounded by said wrap-spring, and a solenoid-operated cam means movable axially of said journal for engaging and tightening said wrap-spring on said journal.

17. The system of claim 13 including a belt drive between said take-up reel gear and said take-up reel pulley.

18. The system of claim 17 wherein said take-up reel drive includes a friction clutch drive operable during forward projection drive, means for over-riding said friction clutch drive for fast forward run, and a one-way clutch oriented for disengagement in reverse drive.

19. The system of claim 18 wherein said over-riding means includes means for disengaging said friction clutch and tensioning said belt drive.

20. The system of claim 19 including a pivotal support arm for said take-up reel, said friction clutch being responsive to pivoting of said take-up reel support arm, and said friction clutch disengaging means including means moved by said control lever for pivoting said take-up reel support arm.

21. The system of claim 13 including means for locking said control lever in said first position until an interval after interruption of said fast run.

22. The system of claim 21 wherein said locking means includes a solenoid-actuated pin for blocking movement of said control lever from said first position.

23. The system of claim 13 wherein said braking means comprises means for operating said supply reel drive pulley engaging means upon interruption of said fast forward run, and means for operating said take-up reel drive pulley engaging means upon interruption of said fast reverse run.

24. The system of claim 13 including means for driving said fast run drive gear, a slip connection between said fast run drive gear and said driving means, means for positively connecting said fast run drive gear to said driving means, and means for selectively engaging said positive connection means for said fast run.

25. The system of claim 24 wherein said slip connection comprises a wrap-spring clutch.

26. The system of claim 24 wherein said positive connection means comprises a member movable to interlock said fast run drive gear to said driving means for rotation together.

27. The system of claim 24 including a solenoid for moving said interlocking member.

28. The system of claim 27 including means for energizing said solenoid for an interval after interruption of said fast run to maintain said positive connection for braking said reel drives.

29. The system of claim 27 including a pin actuated by said solenoid for blocking movement of said control lever from said first position for an interval after interruption of said fast run.

30. The system of claim 24 wherein said braking means comprises means for operating said supply reel drive pulley engaging means upon interruption of said fast forward run means and means for operating said take-up reel drive pulley engaging means upon interruption of said fast reverse run, and means for holding said engagement of said positive connection means for an interval after interruption of said fast run.

31. The system of claim 24 including means operable with positive connection engaging means for locking said control lever in said first position until an interval after interruption of said fast run.

32. The system of claim 24 wherein said slip connection is arranged for slip driving said fast run drive gear for said reverse projection drive, and said supply reel drive pulley is engaged with said supply reel drive gear for said reverse projection drive.

33. The system of claim 32 wherein said slip connection comprises a wrap-spring clutch.

34. The system of claim 13 including a measuring sprocket engaging said filmstrip and turning as said filmstrip moves, and a counter driven by said measuring sprocket to indicate the amount of said filmstrip that has passed through said projector.

35. The system of claim 34 wherein said measuring sprocket has teeth and is turned by said filmstrip.

36. The system of claim 34 wherein said measuring sprocket engages said filmstrip in either position of said control lever.

37. The system of claim 36 wherein said measuring sprocket is arranged in the region of said take-up sprocket.

38. The system of claim 1 wherein said take-up reel drive includes a friction clutch drive operable during forward projection drive, and means for over-riding said friction clutch drive for fast forward run.

39. The system of claim 38 wherein said take-up reel drive includes a one-way clutch oriented for disengagement in reverse drive.

40. The system of claim 39 wherein said over-riding means includes means for disengaging said friction clutch and means for engaging said take-up reel drive with a fast-run drive.

41. The system of claim 40 including a pivotal support arm for said take-up reel, said friction clutch being responsive to pivoting of said take-up reel support arm, and wherein said friction clutch disengaging means includes means moved by said control lever for pivoting said take-up reel support arm to raise the upper end of said take-up reel support arm.

42. The system of claim 39 wherein said braking means includes means for engaging said take-up reel drive with said fast run drive.

43. The system of claim 1 including means for locking said control lever in said first position until an interval after interruption of said fast run.

44. The system of claim 43 wherein said locking means includes a solenoid-actuated pin for blocking movement of said control lever from said first position.

45. The system of claim 1 including loop-forming means comprising:

a. a shaft for supporting and driving said feed sprocket;
b. a wrap-spring clutch coupling said feed sprocket to said shaft;
c. a member rotated when said control lever moves between said first and second positions;
d. means for disengaging said wrap-spring clutch as said member rotates; and
e. means for rotating said feed sprocket on said shaft in response to rotation of said member.

46. The system of claim 45 wherein said member comprises a drum, and a pair of cables moved by said control lever rotate said drum in opposite directions as said control lever moves in opposite directions.

47. The system of claim 45 including sprocket driver means for engaging either free end of said wrap-spring clutch to tighten said clutch, and spring means for coupling said sprocket driver means to said feed sprocket.

48. The system of claim 45 wherein said means for disengaging said wrap-spring clutch comprises means for engaging either free end of said wrap-spring clutch to loosen said clutch, and a gear train from said member to said clutch loosening means.

49. The system of claim 48 including sprocket driver means for engaging either free end of said wrap-spring clutch to tighten said clutch, spring means for coupling said sprocket driver means to said feed sprocket, and said clutch loosening means being arranged for driving a free end of said clutch against said sprocket driver means to rotate said sprocket on said shaft in response to rotation of said member.

50. The system of claim 48 wherein said gear train includes a gear sector for driving through a predetermined angular rotation arranged as said gear sector is disengaged whenever said clutch is tightened to drive said sprocket.

51. The system of claim 50 wherein said member comprises a drum, and a pair of cables moved by said control lever rotates said drum in opposite directions as said control lever moves in opposite directions.

52. The system of claim 51 wherein said drum is rotatably mounted on said shaft, said gear sector is a ring gear carried by said drum, and said gear train includes a planetary gear and a sun gear for rotating said clutch loosening means.

53. The system of claim 52 wherein said gear sector is disengaged from said gear train when said control lever is in either said first or second positions.

54. The system of claim 52 wherein said gear sector includes resilient means for engaging said planetary gear to secure a mesh with said planetary gear.

55. The system of claim 54 wherein said resilient means comprises resiliently deformable teeth on said gear sector.

56. The system of claim 50 wherein said gear sector has resiliently deformable teeth for engaging said gear train to secure a mesh with said gear train.

57. The system of claim 47 wherein said spring coupling means is arranged as a snubber for forward run of said feed sprocket.

58. The system of claim 57 wherein said spring coupling means is arranged for a positive drive coupling between said sprocket driver means and said feed sprocket for reverse run.

* * * * *